United States Patent
Ott

(10) Patent No.: US 12,503,431 B2
(45) Date of Patent: Dec. 23, 2025

(54) METHOD FOR REDUCING THE CONCENTRATION OF $SO_3$ IN A REACTION MIXTURE COMPRISING METHANE SULFONIC ACID AND $SO_3$

(71) Applicant: BASF SE, Ludwigshafen am Rhein (DE)

(72) Inventor: Timo Ott, Duisburg (DE)

(73) Assignee: BASF SE, Ludwigshafen am Rhein (DE)

( * ) Notice: Subject to any disclaimer, the term of this patent is extended or adjusted under 35 U.S.C. 154(b) by 974 days.

(21) Appl. No.: 17/625,672

(22) PCT Filed: Jul. 2, 2020

(86) PCT No.: PCT/EP2020/068707
§ 371 (c)(1),
(2) Date: Jan. 7, 2022

(87) PCT Pub. No.: WO2021/004897
PCT Pub. Date: Jan. 14, 2021

(65) Prior Publication Data
US 2022/0259143 A1  Aug. 18, 2022

(30) Foreign Application Priority Data
Jul. 10, 2019 (EP) .................... 19185468

(51) Int. Cl.
C07C 303/44 (2006.01)
(52) U.S. Cl.
CPC ................. *C07C 303/44* (2013.01)
(58) Field of Classification Search
CPC .................................. C07C 303/44
See application file for complete search history.

(56) References Cited

U.S. PATENT DOCUMENTS

| | | |
|---|---|---|
| 2,493,038 A | 1/1950 | Snyder et al. |
| 2005/0070614 A1 | 3/2005 | Richards |

FOREIGN PATENT DOCUMENTS

| | | |
|---|---|---|
| CN | 101776652 A | 7/2010 |
| EP | 3071549 A1 | 9/2016 |
| EP | 3071549 B1 | 10/2017 |
| WO | 2007136425 A2 | 11/2007 |
| WO | 2015/071365 A1 | 5/2015 |
| WO | 2015071455 A1 | 5/2015 |
| WO | 2017080991 A1 | 5/2017 |
| WO | 2017080994 A1 | 5/2017 |
| WO | 2018208701 A1 | 11/2018 |
| WO | WO2018208701 | * 11/2018 |
| WO | 2019/002447 A1 | 1/2019 |
| WO | 2020212298 A1 | 10/2020 |

OTHER PUBLICATIONS

Muller (Sulfuric Acid and Sulfur Trioxide. Kirk-Othmer Encyclopedia of Chemical Technology. Copyright John Wiley & Sons, Inc., pp. 1-52, Published 2006) (Year: 2006).*
AR (Amazing Rust, pp. 1-4, Published 2007) (Year: 2007).*
Paar (Chemical Online, pp. 1, Published 2013) (Year: 2013).*
European Search Report for EP Patent Application No. 19185468.6, issued on Jan. 17, 2020, 3 pages.
International Search Report for PCT Patent Application No. PCT/EP2020/068707, issued on Oct. 20, 2020, 3 pages.
Robinson, et al., "The reaction of methanesulfonic acid with sulfur trioxide", Canadian Journal of Chemistry, vol. 44, Issue 12, Jun. 1966, pp. 1437-1444.

* cited by examiner

*Primary Examiner* — Andrew D Kosar
*Assistant Examiner* — Blaine G Doletski
(74) *Attorney, Agent, or Firm* — ArentFox Schiff LLP

(57) ABSTRACT

The present invention refers to a method for reducing $SO_3$ concentration in a mixture comprising methane sulfonic acid and $SO_3$, the method comprising:
  i. providing a mixture comprising methane sulfonic acid and $SO_3$,
  ii. determining the amount of an additive necessary to reduce the concentration of $SO_3$ in the mixture by forming a reaction product between the additive and $SO_3$,
  iii. introducing said predetermined amount of the additive into the mixture;
  iv. optionally repeating steps ii. and iii.,
wherein the determination of the amount of additive necessary to reduce the concentration of $SO_3$ in the mixture is performed by measuring conductivity and/or density of the reaction mixture.

16 Claims, 2 Drawing Sheets

Figure 1:
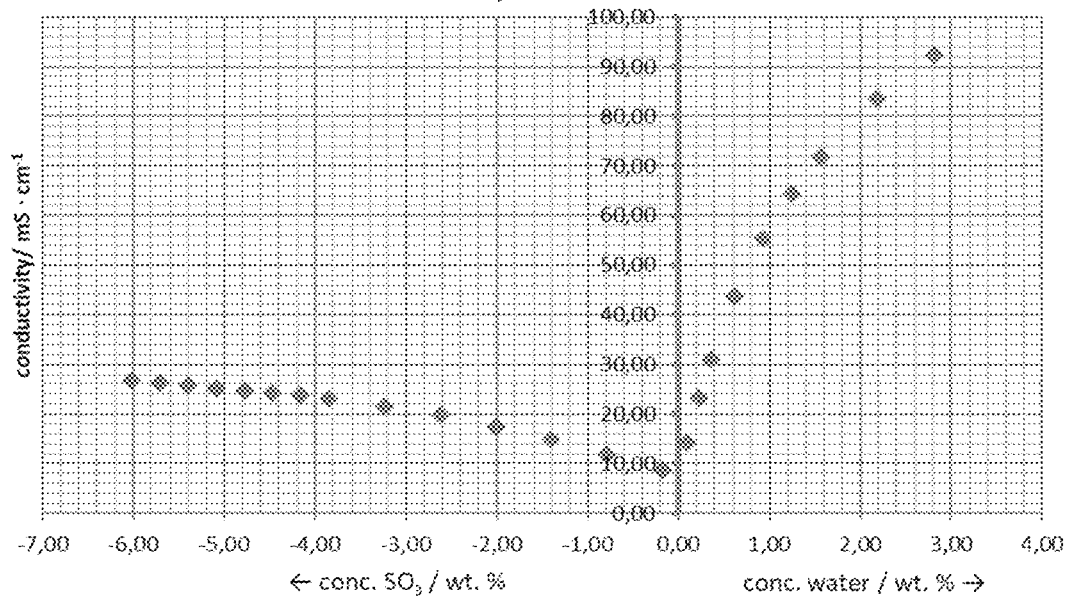
Figure 1:
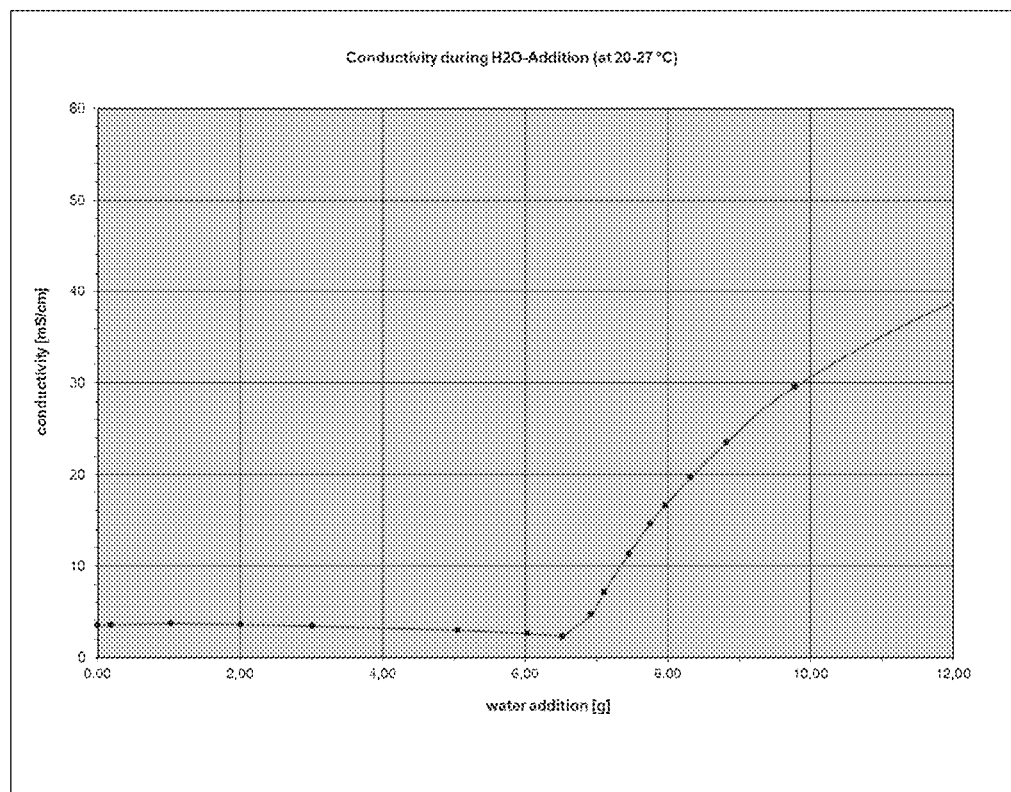

Figure 2: conductivity of water addition to a mixture of ~75,5 wt% MSA ~15 wt% H₂SO₄ and ~9,5% SO₃

Figure 3: conductivity of water addition to a mixture of ~70 wt% MSA ~27 wt% $H_2SO_4$ and ~3% $SO_3$
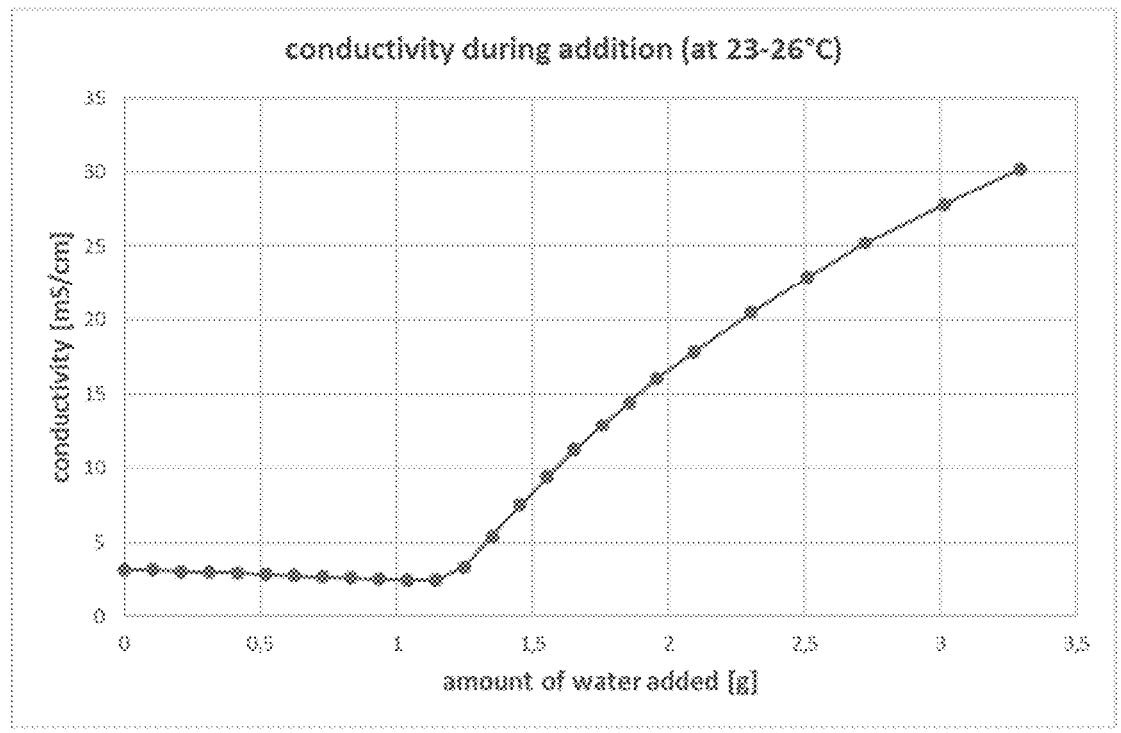
Figure 4: conductivity of MSA 70% addition to a mixture of ~70 wt% MSA ~27 wt% $H_2SO_4$ and ~3% $SO_3$.
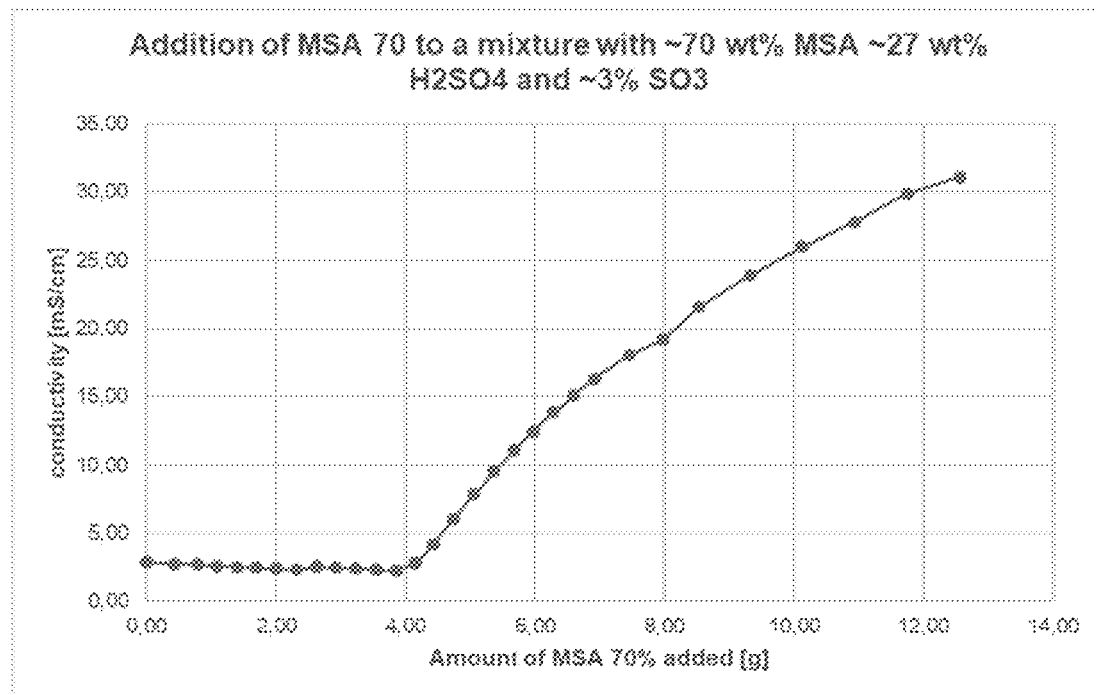

METHOD FOR REDUCING THE CONCENTRATION OF SO₃ IN A REACTION MIXTURE COMPRISING METHANE SULFONIC ACID AND SO₃

CROSS-REFERENCE TO RELATED APPLICATIONS

This application is a National Stage Entry of PCT/EP2020/068707, filed Jul. 2, 2020, which claims priority to EP Application Serial No. 19185468.6, filed Jul. 10, 2019, the disclosures of each of which are hereby incorporated by reference in their entirety.

The present invention refers to a method for reducing the concentration of $SO_3$ in a reaction mixture comprising methane sulfonic acid $CH_3$—$SO_3H$ and $SO_3$. The method comprises a step of determining the amount of an additive needed to reduce the concentration of $SO_3$ by measuring density and/or conductivity of the mixture.

Alkane sulfonic acids are organic acids that can reach a similar acid strength as that of inorganic mineral acids, for example, sulfuric acid. However, in contrast to usual mineral acids such as sulfuric and nitric acids, the sulfonic acids are non-oxidizing and do not give off vapors that are harmful to health, as can be observed with hydrochloric and nitric acids. Further, many sulfonic acids, for example, methane sulfonic acid, are biologically degradable. The applications of sulfonic acids are many, for example, in cleaning agents, surfactants, as catalysts, and in organic synthesis, pharmaceutical chemistry, for example, as protective groups. The salts of sulfonic acids are employed, for example, as surfactants, for example, sodium dodecylsulfonate, or in the electroplating industry, especially as tin, zinc, silver, lead and indium, but also other metal alkylsulfonates. The very high solubility of alkyl sulfonates plays an important role, in particular. Further, no harmful gases are formed in electrolysis, and the use of toxic compounds, for example, cyanide, which is common in many cases, is dispensed with.

The structurally simplest representative of alkane sulfonic acids is methane sulfonic acid. Different methods for the synthesis are described in the prior art, for example in U.S. Pat. No 2,493,038, US 2005/0070614, WO 2007/136425 A2, EP 3071549 A1. In the prior art, methane and $SO_3$ are reacting with each other. The resulting reaction mixture comprises methane sulfonic acid as well as $SO_3$ as non-reacted educt. This $SO_3$ should be removed prior to distillation, as otherwise side products may occur (Robinson and Silberberg: "The reaction of methanesulfonic acid with sulfur trioxide", Canadian Journal of Chemistry, Vol. 44 (1966), 1437ff). Respective removal is for example disclosed in WO 2018/208701 A1 or European patent application 19176382.0. But even though there is the teaching that excess of $SO_3$ is to be removed, there is no teaching on how the amount of additive, needed to remove or at least significantly reduce the concentration of $SO_3$, is determined. Thus, there is the need for a method which enables the reduction of concentration of $SO_3$ in a liquid mixture in a fast and easy manner.

Surprisingly, it was found that conductivity and/or density of a mixture comprising methane sulfonic acid as well as $SO_3$ enables to determine the amount of an additive needed to significantly reduce the concentration of $SO_3$ in said mixture. The problem of the present invention is therefore solved by a method for reducing the $SO_3$ concentration in a mixture comprising methane sulfonic acid and $SO_3$, the method comprising:

i. providing a mixture comprising methane sulfonic acid and $SO_3$,
ii. determining the amount of an additive necessary to reduce the concentration of $SO_3$ in the mixture by forming a reaction product between the additive and $SO_3$,
iii. introducing said predetermined amount of the additive into the mixture;
iv. optionally repeating steps ii. and iii.,
wherein the determination of the amount of additive necessary to reduce the concentration of $SO_3$ in the mixture is performed by measuring conductivity and/or density of the reaction mixture, and wherein the additive preferably comprises water.

The mixture provided in step i. may be a reaction mixture resulting from a method of producing methane sulfonic acid from methane and $SO_3$ as described in the prior art. Preferably, it is a method as disclosed in EP 3071549 A1 and/or European patent application 19176382.0. In these cases, the mixture is a reaction mixture comprising methane sulfonic acid, methane and $SO_3$ as non-reacted educts, sulfuric acid as well as eventually occurring side products. In a preferred embodiment, providing of step i. comprises:

in a first step reacting methane sulfonic acid and hydrogen peroxide with each other to form a compound according to the following formula (I)

$$ALK-SO_2-O-O-X \qquad (I)$$

wherein ALK is methyl and X=hydrogen. This compound according to formula (I) is then provided in a reactor together with sulfur trioxide and methane. Due to the addition of the methane, a pressure within a range of from 1-200 bar is set. The reaction mixture is inside a high-pressure reactor and the temperature is controlled to be within a range of from 0° C. to 100° C. Due to the reaction of the components to with each other, drop of the pressure can be monitored. This reaction mixture comprises the reaction product, namely the alkane sulfonic acid, as well as non-reacted educts, which are hydrocarbon and sulfur trioxide.

$SO_3$ may be provided as pure $SO_3$ or as oleum within the meaning of the present invention.

The additive is a compound which is able to react with $SO_3$ forming a compound preferably with a boiling point different from that of methane sulfonic acid. Preferably, the additive comprises water so that sulfuric acid is formed. The additive is a compound which is able to react with $SO_3$ forming a compound preferably with a boiling point different from that of the sulfonic acid. Preferably, the additive comprises water so that sulfuric acid is formed. If necessary, sulfuric acid or any other reaction product of $SO_3$ and the additive may be separated from the sulfuric acid in a subsequent step. This may be performed via distillation, rectification or any other method known from the prior art.

The additive preferably comprises water, but the additive may further comprise hydrogen peroxide, sulfuric acid, methane sulfonic acid, $ALK-SO_2-O-O-X$ and/or $ALK-SO_2-O-O-SO_2-O-X$, wherein ALK is methane and X is hydrogen, or mixtures of two or more of them. Usually, the additive always comprises water. Thus, if for example methane sulfonic acid is added as additive, the additive comprises water and the respective methane sulfonic acid. The concentration of water in the additive is preferably at least 2% by weight or more or 5% by weight or more, alternatively it is 10% by weight or more, especially at least 20% by weight or more, more preferably at least 25% by weight or more, especially preferred at least 30% by weight or more, always based on the total weight of the additive. The higher the concentration of water, the lower the amount of additive needed to reduce the concentration of $SO_3$ in the mixture.

It may also be the case that in a first step pure water is added and afterwards an additive with a low concentration of water to better control the complete concentration of water added into the mixture. Steps iii. and iv. of the method of the present invention may be repeated. It is also within the scope of the present invention that in a first step a first additive is added, wherein when repeating step ii another additive is added.

It is of course also within the scope of the present invention, that not only one additive but mixtures of different additives are added. If for example ALK—$SO_2$—O—O—$SO_2$—OX and/or ALK—$SO_2$—O—O—X with $H_2O_2$ are added, the reaction between $SO_3$ and methane may be activated again, so that a higher yield can be obtained. Sulfuric acid or water can be added to destroy disulfuric acid. Water is less preferred as additive, as the reaction between $SO_3$ or disulfuric acid and water is highly exotherm. If the temperature inside the reaction vessel is getting too high, side products may occur. Thus, by using an additive which comprises water not only the composition of the reaction mixture can be controlled leading to better distillation performance, but also the temperature can be better controlled, leading to less side products. Therefore, the concentration of water of the additive is preferably 90% by weight or less, especially 80% by weight or less, more preferred 75% by weight or less, especially preferred 70% by weight or less.

A further advantage of the method of the present invention in a preferred embodiment is the use of the specific additive. When adding a preferred additive comprising water and hydrogen peroxide, sulfuric acid, alkane sulfonic acid, ALK—$SO_2$—O—O—X, or ALK—$SO_2$—O—O—$SO_2$—O—X, it is possible to adapt the exact composition of the mixture. Thus, the concentration of methane sulfonic acid and sulfuric acid in the mixture can be controlled. This is of advantage if a distillation step shall be performed afterwards.

In a preferred embodiment, the method according to the present invention further comprises the step of v. purification of the mixture, especially by distillation.

Purification is needed, if pure methane sulfonic acid shall be the reaction product or if the concentration of methane sulfonic acid should be increased. This may be performed by distillation and/or crystallization.

Preferably, the additive comprises methane sulfonic acid and water. It was found that the distillation step is more effective in cases where the concentration of the methane sulfonic acid in the mixture to be distilled is higher, the distillation is more effective. Preferably, the concentration o methane sulfonic acid in the mixture to be distilled is at least 30% by weight to 70% by weight, especially 35% by weight to 65% by weight, preferably 40% by weight to 60% by weight or at about 50% by weight.

The mixture provided in step i. of the method of the present invention may also be obtained after using methane sulfonic acid in any process and it is intended to recycle the methane sulfonic acid after this process. In cases, where the mixture comprises $SO_3$ besides the methane sulfonic acid, the method of the present invention can be applied as well.

In cases where the mixture comprises further sulfuric acid ($H_2SO_4$), $SO_3$ will react with the sulfuric acid leading to the formation of disulfuric acid. In the presence of methane, also the formation of a corresponding methyl disulfuric acid ($CH_3$—$SO_2$—O—$SO_3H$) is possible. If in the following disulfuric acid is mentioned, this always also means the corresponding methyl disulfuric acid. Nevertheless, the additive which comprises water will also react with disulfuric acid leading to the formation of twice the equivalence of sulfuric acid. Due to the high hygroscope properties of disulfuric acid, it is not necessary to add pure water, but it is sufficient to add an additive which comprises water.

The amount of additive needed has to be determined in order to impart the desired $SO_3$ content to the mixture. The concentration of $SO_3$ shall preferably reduced by 50% or more or 70% or more, advantageously by 90% or more, especially by 95% or more, preferably by 98% or more, especially preferred by at least 99%. If stochiometric amounts of water are added, it can be assumed that $SO_3$ is completely removed. $SO_3$ reacts with water in a highly exothermic reaction to sulfuric acid. As long as the mixture is liquid, the equilibrium of the reaction is more or less completely on the side of the product. In a solution of $SO_3$ and water, comprising equivalent amounts of the compounds, no free $SO_3$ can be detected in the liquid. Thus, with the method of the present invention it is possible to remove $SO_3$ quasi completely from the mixture.

To do so, the concentration of $SO_3$ in the mixture has to be determined. At the same time, the concentration of additive and especially of water in the mixture has to be determined, as the concentration of water in the mixture should usually be kept well below 3% by weight, based on the total weight of the mixture. Usually, anhydrous methane sulfonic should be obtained in a process, where the method of the present invention is art of the purification. The desired water/additive content depends on the mixture provided in step i. and also on the overall process, of which the method of the present invention may be part of it.

To determine the amount of additive needed for imparting the desired $SO_3$ concentration, it is essential to know the relation between $SO_3$ concentration in the mixture, water concentration in the mixture and conductivity and density of the mixture respectively. Hence, for a specific mixture, a calibration curve has to be established. FIG. 1 shows exemplarily a calibration curve for a mixture comprising methane sulfonic acid, sulfuric acid and $SO_3$ and where water is added as additive.

In the X-direction, the concentration of $SO_3$ and water respectively are shown in weight percent. The Y-axis shows the conductivity in mS/cm. Starting from a concentration of sulfur trioxide of approximately 6 weight-% (based on the total weight of the composition, which is 100% by weight), water was added. This results in an increase of the conductivity. At a certain point, essentially all sulfur trioxide was destroyed due to the reaction with water so that only sulfuric acid is present. Addition of excess of water results in a dramatic increase of conductivity, enabling to control the amount of additive to be added by measuring the conductivity. The content of sulfur trioxide and water in the mixture is thus relevant for the conductivity of a mixture provided in step i.

Preferably, the amount of water added is slightly above stochiometric compared to the concentration of $SO_3$ present in the mixture. Preferably, the amount of water is slightly above this, which enables to reduce the formation of methane sulfonic acid anhydride. Nevertheless, the presence of water in the mixture should be kept as low as possible. The excess of water is therefore preferably no more than 3% by weight, especially it is 2.5% by weight or less, advantageously 2% by weight or less or 1.5% by weight or less compared to the concentration of $SO_3$ present in the mixture.

The concentration of water in the mixture after addition of the additive is preferably within a range of from 0.1% by weight to 2% by weight, especially from 0.2% by weight to 1% by weight, preferred from 0.3% by weight to 0.6% by weight, especially preferred from 0.4% by weight to 0.5% by weight, where the concentration is based on the total weight of the composition as a whole. Surprisingly it was found that the formation of methane sulfonic acid anhydride in further purification steps, especially during distillation, can tremendously reduced in cases where the mixture comprises water in the above-mentioned concentrations.

With the method according to the invention, it is thus not only possible to determine the amount of additive to be added and to significantly reduce the concentration of $SO_3$ sulfur trioxide from the mixture, but also to control the concentration of water present in the mixture which helps to reduce the concentration of unwanted side products.

Similar to the measurement of the conductivity, also the density of the mixture can be determined. Again, the density is dependent on the concentration of sulfur trioxide and water being present in the mixture. The addition of the additive comprising water results in a reduced concentration of sulfur trioxide. This leads to an increased density of the mixture. With excess of water, the density of the mixture is decreasing again.

Thus, in a first aspect it is sufficient to determine either conductivity or density of the mixture to determine the amount of additive needed to react with $SO_3$ present in the mixture. In a preferred embodiment, both of density and conductivity are determined. This helps for a better determination of the amount of additive to be added and provides for a higher security of the measurement.

For both of conductivity and density are temperature dependent, it is possible to provide measurements with a temperature correlation so that the shown values of a specific measurement can be compared with a baseline and an automatic control for the addition of the additive can be provided.

Further advantage of conductivity and density measurements is that the measurement is fast so that the response, i.e. addition or non-addition of the additive is fast as well. This enables to provide a method not only in a batch (i.e., non-continuous) process but also in a continuous process.

According to one embodiment, the method according to the present invention is thus performed in a batch process. In a preferred embodiment, the method according to the present invention is performed in a continuous process. Especially in a continuous process it is possible to determine the values for density and/or conductivity not only in one position of the continuous reactor but to perform it at several different positions. Usually, the continuous process is performed in a pipe. In this case, several measurements distributed over the pipe would be possible and preferred. The number of measure points would be two or more, preferably three or more, especially four or more, depending on the size and length of the continuous reactor. Especially in this case, it may be necessary to repeat steps iii. and iv. of the method of the present invention. But independently of a continuous or batch process, it is of course within the scope of the present invention that after addition of the additive for a first time, density and/or conductivity of the mixture are determined again, and further additive is added afterwards.

Destroying $SO_3$ with an additive comprising water results in the formation of heat, as the reaction is an exothermic one. This heat has to be removed, which can easily be performed by simply mixing the reaction mixture. The mixing can be performed by a static or a non-static mixer, i.e. a paddle mixer or others. It is also dependent on where the method is performed in a noncontinuous batch process or a continuous process. In a continuous process, non-static mixers can be present through the continuous reactor, i.e. the pipe. In a non-continuous batch process, it is preferred that non-static mixers are used.

Addition of the additive results in an exothermic reaction. Thus, the mixture should be cooled during and after the addition of the additive to keep the temperature constant, if needed. Of course, the increase of the temperature is dependent on the concentration of $SO_3$ and the concentration of $SO_3$ reacting with water. An increase in temperature may lead to the formation of side products. Thus, the temperature should in the present case be kept well below 80° C., especially well below 70° C., preferably at 65° C. or less, preferred at 60° C. or less or at 55° C. or less. Temperatures of 20° C. or 25° C. up to 35° C. or up to 40° C. are suitable for the mixture prior to addition of the additive. Cooling is necessary but can be performed with water cooling for example. Stirring also helps to distribute the heat throughout the mixture and enable a more effective cooling of the system.

The method of the present invention enables thus a good control over the composition of the reaction mixture, after reaction between methane and $SO_3$ was performed prior to the further purification of the remaining reaction mixture. This purification can be performed by any method known in the art. For example, distillation or melt crystallization are described in WO 2017/080994 A1, WO 2017/080991 A1, WO 2018/208701 A1 or EP 19176382.0. The purification is performed by distillation, excess of methane should be removed prior to the distillation. The excess of methane may be removed prior to the addition of the additive to the reaction mixture or afterwards. Preferably, non-reacted methane is removed after $SO_3$ was destroyed. This is preferred as removal of methane is usually performed by simply reducing the pressure. If this is performed prior to destroyment of sulfur trioxide, said sulfur trioxide may be released together with the methane, which is of course not preferred. Therefore, preferably first non-reacted sulfur trioxide which is present in the reaction mixture is destroyed, where the amount of additive to be added is determined by measurement of conductivity and/or density of the reaction mixture. Afterwards, the methane, which is again non-reacted educt, is performed.

Measuring conductivity and/or density enable thus a high quality determination of additive which is needed to reduce or even remove $SO_3$ which is present in a mixture Besides conductivity and density, it is also possible and preferred to determine the acoustic velocity of the mixture. The acoustic velocity especially enables the determination of the content of $SO_3$ in oleum. Also, the determination of the speed velocity enables thus to determine the amount of additive needed to reduce or even remove excess of $SO_3$. Determination of the acoustic velocity improves the accuracy of the present method and increases the security. If one of the measurements shows wrong results, still there are two measure methods enabling determination in the amount of additive to be added. Further methods, such as RAMAN spectroscopy, IR spectroscopy, UV-Vis spectroscopy, viscosity, gravimetric measurements, refractive index, titration and thermal conductivity may be are determined as well or alternatively. Density and conductivity are the preferred methods, as the measurement is fast and can easily be performed and can be performed inline. The other mentioned methods cannot be performed in-line thus they cannot be used in a continuous process but for a batch mood only.

Nevertheless, also the above-mentioned methods enabling to determine the amount of additive to be added to destroy excess of $SO_3$.

Conductivity in general is a parameter used to measure the ionic concentration and activity of a solution. The more salt, acid or alkali in a solution, the greater its conductivity. The unit of conductivity is S/m, often also S/cm.

Conductivity is measured by making a measurement of the electrical resistance. The simplest kind of measuring cell used consists of two similar electrodes. An alternating voltage applied to one of the electrodes causes the ions in the solution to migrate towards the electrodes. The more ions in the solution, the greater the current which flows between the electrodes. The instrument measures the current and uses Ohm's law to calculate first the conductance of the solution and then—by taken the cell data into account—the conductivity. The measurements described in this patent may be done using a Cond330i/SET device (by WTW, manufacturer of conductivity measurement devices) with a TetraCon 325/Pt electrode.

Conductivity may also be measured based on or analogous to DIN EN 27888 (November 1993).

Density measurements may, for example, be done via oscillation-type density meters, as described e.g. in ISO 15212-1 (June 1999) and 15212-2 (July 2002). Alternative measurements of density are also possible. The sensors used in density meters are electrically or mechanically induced oscillating systems, whose oscillation frequencies or periodes are a function of the sample density. Depending on the sensor design, the fluid sample can either flow through the sensor (e.g. U-formed sensors, used in the aforementioned measurements) or the sensor can be immersed in the liquid. Instrument constants of the adjusted density meter are used to calculate the sample density from the oscillation frequency or oscillation periode.

In the following paragraphs, several non-limiting experimental examples are reported, in order to illustrate some aspects of the present invention.

EXAMPLE 1

In a glass flask equipped with a magnetic stir bar, a conductivity probe (a Mettler Toledo conductivity probe 710) and a thermometer, 151.51 g of a mixture of 143.03 g sulfuric acid and 8.48 g $SO_3$ are filled in and the temperature controlled to 20° C. Under inert gas atmosphere ($N_2$), water was added portionwise into the mixture and the conductivity was measured. During the addition, the conductivity drops from 26.8 mS/cm to 8.7 mS/cm upon addition of 1.9 g $H_2O$, which represents an equimolar amount to the $SO_3$ amount in the starting mixture. Further addition up to a total of 6.4 g $H_2O$ increased the conductivity to 92.4 mS/cm, as seen in the FIG. 1 and table below. The kink in the conductivity curve represents the amount of additive needed to reduce the amount of $SO_3$ according to the application. Based on the $SO_3$ amount in the starting mixture, a conductivity of ~31 mS/cm is obtained for ~0.5 wt % $H_2O$ in the reaction mixture.

TABLE 1 conductivity of water addition to oleum 32

| water addition m[g]/portion | Σ water m[g] | conductivity mS/cm |
|---|---|---|
| 0 | 0.00 | 26.80 |
| 100 | 0.10 | 26.30 |

TABLE 1-continued conductivity of water addition to oleum 32

| water addition m[g]/portion | Σ water m[g] | conductivity mS/cm |
|---|---|---|
| 100 | 0.20 | 25.80 |
| 100 | 0.30 | 25.20 |
| 100 | 0.40 | 24.80 |
| 100 | 0.50 | 24.30 |
| 100 | 0.60 | 23.70 |
| 100 | 0.70 | 23.00 |
| 200 | 0.90 | 21.50 |
| 200 | 1.10 | 19.81 |
| 200 | 1.30 | 17.43 |
| 200 | 1.50 | 14.99 |
| 200 | 1.70 | 11.89 |
| 200 | 1.90 | 8.70 |
| 200 | 2.10 | 14.26 |
| 200 | 2.30 | 23.30 |
| 200 | 2.50 | 31.10 |
| 400 | 2.90 | 43.70 |
| 500 | 3.40 | 55.30 |
| 500 | 3.90 | 64.40 |
| 500 | 4.40 | 71.80 |
| 1000 | 5.40 | 83.60 |
| 1000 | 6.40 | 92.40 |

EXAMPLE 2

Addition of Water 315.11 g of a mixture consisting of 48.78 g Oleum 65 (with a $SO_3$ concentration of 62-65 wt %), 29.49 g $H_2SO_4$ (100%) and 236.84 g MSA (100%) is filled in a 250 ml 4-neck flask equipped with a magnetic stir bar, a conductivity probe (Cond330i/SET (WTW) with TetraCon 325/Pt electrode), a reflux condenser and a thermometer. The resulting mixture consists of ~9.5 wt % $SO_3$, ~15 wt % $H_2SO_4$ and ~75.5 wt % MSA. Under stirring, small amounts of deionized water was added dportionwise and the conductivity measured at temperatures between 23-27° C., as seen in the table below. The conductivity decreases until an equimolar amount of water (i.e. ~6.9 g) is added. Further addition increases the conductivity again. The kink in the conductivity curve represents the amount of additive needed to reduce the amount of $SO_3$ according to the application.

TABLE 2 conductivity of water addition to a mixture of ~75.5 wt % MSA~15 wt % $H_2SO_4$ and~9.5% $SO_3$

| Σ water m[g] | conductivity mS/cm | temperature ° C. |
|---|---|---|
| 0.00 | 3.50 | 21.50 |
| 0.18 | 3.55 | 22.60 |
| 1.02 | 3.67 | 27.20 |
| 2.01 | 3.58 | 25.90 |
| 3.01 | 3.41 | 23.60 |
| 5.05 | 2.97 | 26.00 |
| 6.03 | 2.58 | 26.50 |
| 6.52 | 2.35 | 26.10 |
| 6.52 | 2.28 | 21.80 |
| 6.92 | 4.67 | 23.50 |
| 7.10 | 7.14 | 23.60 |
| 7.45 | 11.30 | 24.40 |
| 7.75 | 14.63 | 23.90 |
| 7.96 | 16.59 | 24.30 |
| 8.32 | 19.71 | 24.10 |

TABLE 2-continued conductivity of water addition to a mixture of ~75.5 wt % MSA ~15 wt % $H_2SO_4$ and ~9.5% $SO_3$

| Σ water m[g] | conductivity mS/cm | temperature ° C. |
|---|---|---|
| 8.82 | 23.50 | 24.20 |
| 9.78 | 29.60 | 24.70 |
| 12.17 | 39.30 | 26.00 |

EXAMPLE 3

Addition of Water 191.57 g of a mixture consisting of 18.01 g Oleum 32 (with a $SO_3$ concentration of 30-32 wt %), 39.47 g $H_2SO_4$ (100%) and 134.08 g MSA (100%) is filled in a 250 ml 4-neck flask equipped with a magnetic stir bar, a conductivity probe (Cond330i/SET (WTW) with TetraCon 325/Pt electrode), a reflux condenser and a thermometer. The resulting mixture consists of ~3 wt % $SO_3$, ~27 wt % $H_2SO_4$ and ~70 wt % MSA. Under stirring, small amounts of deionized water was added portionwise and the conductivity measured at temperatures between 24-26° C., as seen in the table below. The conductivity decreases until an equimolar amount of water (i.e. ~1.2 g) is added. Further addition increases the conductivity again. The kink in the conductivity curve represents the amount of additive needed to reduce the amount of $SO_3$ according to the application.

TABLE 3 conductivity of water addition to a mixture of ~70 wt % MSA ~27 wt % $H_2SO_4$ and ~3% $SO_3$

| Σ water m[g] | conductivity mS/cm | temperature ° C. |
|---|---|---|
| 0.00 | 3.15 | 24.80 |
| 0.10 | 3.15 | 25.60 |
| 0.21 | 3.06 | 24.60 |
| 0.31 | 3.01 | 25.40 |
| 0.42 | 2.95 | 25.60 |
| 0.52 | 2.85 | 25.30 |
| 0.62 | 2.79 | 25.20 |
| 0.73 | 2.70 | 24.40 |
| 0.83 | 2.64 | 25.30 |
| 0.94 | 2.55 | 24.50 |
| 1.04 | 2.50 | 24.80 |
| 1.15 | 2.47 | 25.60 |
| 1.25 | 3.37 | 23.80 |
| 1.35 | 5.45 | 24.30 |
| 1.45 | 7.57 | 24.70 |
| 1.55 | 9.42 | 25.10 |
| 1.65 | 11.24 | 25.50 |
| 1.76 | 12.88 | 23.70 |
| 1.856 | 14.47 | 24.10 |
| 1.957 | 16.07 | 24.50 |
| 2.093 | 17.81 | 25.10 |
| 2.303 | 20.50 | 25.20 |
| 2.512 | 22.90 | 26.00 |
| 2.721 | 25.20 | 24.60 |
| 3.016 | 27.80 | 25.80 |
| 3.295 | 30.20 | 23.00 |

EXAMPLE 4

Addition of MSA 70%

190.99 g of a mixture consisting of 18.25 g Oleum 32 (with a $SO_3$ concentration of 30-32 wt %), 39.47 g $H_2SO_4$ (100%) and 133.27 g MSA (100%) is filled in a 250 ml 4-neck flask equipped with a magnetic stir bar, a conductivity probe (Cond330i/SET (WTW) with TetraCon 325/Pt electrode), a reflux condenser and a thermometer. The resulting mixture consists of ~3 wt % $SO_3$, ~27 wt % $H_2SO_4$ and ~70 wt % MSA. Under stirring, small amounts of MSA 70% was added portion-wise and the conductivity measured at temperatures between 22-26° C., as seen in the table below. The conductivity decreases until an equimolar amount of water (i.e. ~1.2 g, which equals ~4 g MSA 70%) is added. Further addition increases the conductivity again. The kink in the conductivity curve represents the amount of additive needed to reduce the amount of $SO_3$ according to the application.

TABLE 4 conductivity of MSA 70% addition to a mixture of ~70 wt % MSA ~27 wt % $H_2SO_4$ and ~3% $SO_3$. The water amount is calculated based on 30 wt % water in MSA.

| Σ MSA 70% m[g] | Σ water m[g] | conductivity mS/cm | temperature ° C. |
|---|---|---|---|
| 0.00 | 0.00 | 2.89 | 23.00 |
| 0.42 | 0.13 | 2.77 | 23.90 |
| 0.79 | 0.24 | 2.73 | 24.50 |
| 1.09 | 0.33 | 2.60 | 25.00 |
| 1.40 | 0.42 | 2.54 | 25.40 |
| 1.70 | 0.51 | 2.48 | 25.80 |
| 2.01 | 0.60 | 2.40 | 23.20 |
| 2.31 | 0.69 | 2.34 | 23.90 |
| 2.63 | 0.79 | 2.57 | 24.50 |
| 2.93 | 0.88 | 2.51 | 25.00 |
| 3.24 | 0.97 | 2.45 | 25.50 |
| 3.54 | 1.06 | 2.34 | 23.30 |
| 3.85 | 1.16 | 2.31 | 23.90 |
| 4.15 | 1.25 | 2.80 | 24.30 |
| 4.43 | 1.33 | 4.21 | 24.50 |
| 4.74 | 1.42 | 6.06 | 24.70 |
| 5.06 | 1.52 | 7.85 | 24.50 |
| 5.37 | 1.61 | 9.55 | 24.60 |
| 5.676 | 1.7028 | 11.06 | 24.80 |
| 5.973 | 1.7919 | 12.47 | 24.90 |
| 6.285 | 1.8855 | 13.88 | 25.00 |
| 6.597 | 1.9791 | 15.08 | 22.40 |
| 6.912 | 2.0736 | 16.31 | 22.60 |
| 7.448 | 2.2344 | 18.04 | 23.00 |
| 7.983 | 2.3949 | 19.22 | 23.30 |
| 8.524 | 2.5572 | 21.60 | 23.70 |
| 9.323 | 2.7969 | 23.90 | 24.20 |
| 10.128 | 3.0384 | 26.00 | 24.60 |
| 10.935 | 3.2805 | 27.80 | 25.10 |
| 11.744 | 3.5232 | 29.90 | 25.40 |
| 12.555 | 3.7665 | 31.10 | 25.80 |

The appended figures further illustrate some aspects of the invention and of the above experimental examples.

The invention claimed is:

1. A method for reducing $SO_3$ concentration in a mixture comprising methane sulfonic acid and $SO_3$, the method comprising:
   i. providing a mixture comprising methane sulfonic acid and $SO_3$,
   ii. measuring conductivity and/or density of the mixture,
   iii. comparing the conductivity and/or density of the mixture with a calibration curve to determine an amount of an additive that is required to reduce a selected amount of the $SO_3$ in the mixture via reaction with the additive,
   iv. adding the amount of the additive into the mixture to react the selected amount of $SO_3$ with the additive;
   v. optionally repeating steps ii., iii., and iv.,
   wherein the additive comprises water.

2. The method according to claim 1, further comprising determining acoustic velocity of the mixture.

3. The method according to claim 1, wherein the selected amount is 90% or more of the $SO_3$ in the mixture.

4. The method according to claim 1, further comprising performing RAMAN and/or IR and/or UV-Vis spectroscopy on the mixture, and/or performing viscosity measurements and/or gravimetric measurements and/or refractive index measurements and/or titration measurements and/or thermal conductivity measurements on the mixture.

5. The method according to claim 1, wherein the mixture further comprises methane and/or sulfuric acid.

6. The method according to claim 1, wherein the additive additionally comprises hydrogenperoxide, sulfuric acid, alkane sulfonic acid, ALK-$SO_2$—O—OX, and/or ALK-$SO_2$—O—O—$SO_2$—OX, wherein ALK is methane, and X is hydrogen, as well as mixtures of two or more of them.

7. The method according to claim 1, wherein the amount of additive is at least stochiometric compared to the concentration of $SO_3$ in the mixture.

8. The method according to claim 1, wherein the determination of the amount of additive is performed at least in one position of a reactor in which the method is performed.

9. The method according to claim 1, wherein addition of the amount of additive is performed under mixing.

10. The method according to claim 1, further comprising
vi. purifying the mixture of iv. or v.

11. The method according to claim 1, wherein the method is a continuous or a non-continuous process.

12. The method according to claim 1, wherein the selected amount is 95% or more of the $SO_3$ in the mixture.

13. The method according to claim 1, wherein the determination of the amount of additive is performed in at least two different positions of a reactor in which the method is performed.

14. The method according to claim 1, wherein the determination of the amount of additive is performed in at least three or more different positions of a reactor in which the method is performed.

15. The method according to claim 10, wherein purification is performed via distillation.

16. The method according to claim 1, wherein the method is a continuous process.

* * * * *